US009923807B2

(12) United States Patent
Kodaypak et al.

(10) Patent No.: US 9,923,807 B2
(45) Date of Patent: Mar. 20, 2018

(54) INTELLIGENT SIGNALING ROUTING FOR MACHINE-TO-MACHINE COMMUNICATIONS

(71) Applicant: AT&T Intellectual Property I, L.P., Atlanta, GA (US)

(72) Inventors: Rajendra Prasad Kodaypak, Sammamish, WA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

(21) Appl. No.: 15/048,197

(22) Filed: Feb. 19, 2016

(65) Prior Publication Data

US 2017/0244629 A1    Aug. 24, 2017

(51) Int. Cl.
*H04L 12/28* (2006.01)
*H04L 12/707* (2013.01)
*H04W 4/00* (2018.01)
*H04W 76/02* (2009.01)

(52) U.S. Cl.
CPC ............. *H04L 45/22* (2013.01); *H04W 4/005* (2013.01); *H04W 76/02* (2013.01)

(58) Field of Classification Search
CPC ........ H04L 45/22; H04W 76/02; H04W 4/005
See application file for complete search history.

(56) References Cited

U.S. PATENT DOCUMENTS

| 8,566,474 | B2 | 10/2013 | Kanode et al. |
| 8,644,324 | B2 | 2/2014 | Kanode et al. |
| 8,737,304 | B2 | 5/2014 | Karuturi et al. |
| 8,750,825 | B2 | 6/2014 | Patterson et al. |
| 8,831,016 | B2 | 9/2014 | Wallace et al. |
| 8,918,469 | B2 | 12/2014 | Sprague et al. |
| 8,954,080 | B2 | 2/2015 | Janakiraman et al. |
| 9,001,660 | B1 * | 4/2015 | Zhu ..................... H04L 47/2458 370/230 |
| 9,106,769 | B2 | 8/2015 | Kanode et al. |

(Continued)

OTHER PUBLICATIONS

Nas, Peter, "LTE and Diameter Routing Use Cases," F5 Agility 2014, 2014, f5.

(Continued)

*Primary Examiner* — Afshawn Towfighi
(74) *Attorney, Agent, or Firm* — Hartman & Citrin LLC

(57) ABSTRACT

Concepts and technologies disclosed herein are directed to intelligent signaling routing for machine to machine ("M2M") communications, such as communications for Internet of things ("IoT") devices. According to one aspect of the concepts and technologies disclosed herein, a mobility management entity ("MME") can receive an attach request or a tracking area update ("TAU") from a device to establish a connection to a network. The MME can extract device identification information from the attach request. The device identification information can identify the device as either a UE or IoT device. The MME can determine an appropriate DIAMETER routing agent ("DRA") of a plurality of DRAs to which to route signaling traffic associated with the device. The plurality of DRAs can include DRA and an IoT application-specific DRA. The MME can route the signaling traffic to the appropriate DRA of the plurality of DRAs.

20 Claims, 8 Drawing Sheets

(56) References Cited

U.S. PATENT DOCUMENTS

| | | |
|---|---|---|
| 2013/0311629 A1 | 11/2013 | Chastain |
| 2014/0043969 A1 | 2/2014 | Xu |
| 2014/0376380 A1 | 12/2014 | Campbell et al. |
| 2015/0149656 A1* | 5/2015 | McMurry ............... H04L 45/00 709/238 |
| 2017/0180277 A1* | 6/2017 | Brady ..................... H04L 51/04 |

OTHER PUBLICATIONS

"LTE; General Packet Radio Service (GPRS) enhancements for Evolved Universal Terrestrial Radio Access Network (E-UTRAN) access," Technical Specification, Nov. 2012, 3GPP TS 23.401 version 11.3.0 Release 11, ETSI.

"3$^{rd}$ Generation Partnership Project; Technical Specification Group Core Network and Terminals; Evolved Packet System (EPS); Mobility Management Entity (MME) and Serving GPRS Support Note (SGSN) related interfaces based on Diameter protocol (Release 13)," Technical Specification, Dec. 2015, 3GPP TS 29.272 V13.4.0 (Dec. 2015), 3GPP.

\* cited by examiner

INTELLIGENT SIGNALING ROUTING FOR MACHINE-TO-MACHINE COMMUNICATIONS

BACKGROUND

The Internet of Things ("IoT") is gaining significant momentum in the industry, particularly as machine-to-machine ("M2M") connectivity improves with new mobile communications technologies. The number of IoT devices is expected to grow from 5 billion in 2015 to over 25 billion by 2020. As the numbers of IoT devices, IoT gateways, and applications grow over time, the net IoT traffic resulting from narrow-band upstream data connections translates into an ultra-broadband service channel that requires an end-to-end low latency data transmission path. Ultra-broadband service channels require efficient integration of several network elements to ensure IoT connectivity integrity and reliable service assurance.

SUMMARY

Concepts and technologies disclosed herein are directed to intelligent signaling routing for M2M communications, such as communications for IoT devices. According to one aspect of the concepts and technologies disclosed herein, a mobility management entity ("MME") can receive an attach request from a device to establish a connection to a network. The MME can extract device identification information from the attach request and/or a tracking area update ("TAU") request during mobility. The device identification information can identify the device as either a UE or IoT device. The MME can determine an appropriate DIAMETER routing agent ("DRA") of a plurality of DRAs to which to route signaling traffic associated with the device. The plurality of DRAs can include DRA and an IoT application-specific DRA. The MME can route the signaling traffic to the appropriate DRA of the plurality of DRAs.

In some embodiments, the device identification information includes an International Mobile Subscriber Identity ("IMSI"), a Mobile Station International Subscriber Directory Number ("MSISDN"), an International Mobile Equipment Identity ("IMEI"), or a combination of an IMSI and an IMEI. The device identification information, in some embodiments, can additionally include a device category that specifies a category to which the device belongs. The device identification information can identify the device as being either a device for a standard mobile telecommunications services, such as voice and/or data. The device identification information can alternatively identify the device as an IoT device.

In some embodiments, the MME can determine the appropriate DRA to which to route signaling traffic associated with the device based at least in part upon a given set of devices within a specific IMSI number series. The IMSI associated with the device can be included within the specific IMSI number series that identifies the given set of devices as IoT devices, and as such, the device as an IoT device. In these embodiments, the appropriate DIAMETER routing agent is the IoT application-specific DRA. In some embodiments, the IoT application-specific DRA is part of an IoT application-specific DRA routing agent pool that includes other IoT application-specific DRAs. The IoT application-specific DRAs can be embodied as physical network functions ("PNFs") or virtual network functions ("VNFs").

In some embodiments, the MME can instruct the IoT application-specific DRA to route the signaling traffic to the DRA as a fall back mechanism in response to an overload trigger detected by the IoT application-specific DRA.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
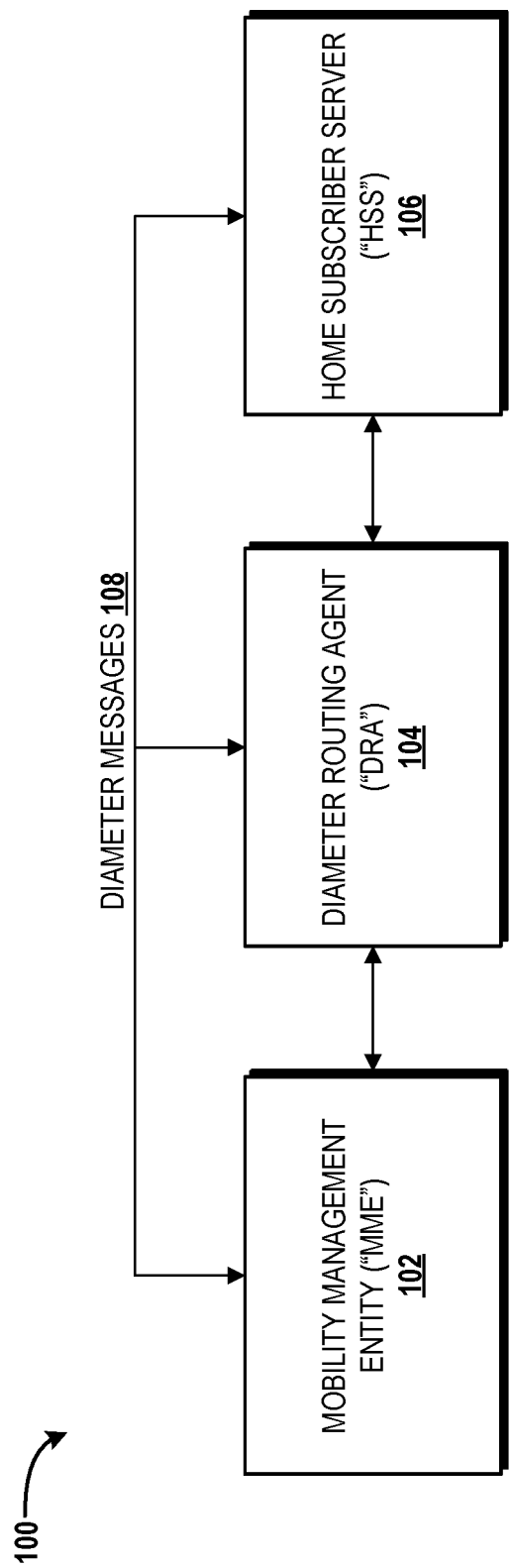
FIG. 1 is a block diagram illustrating aspects of an S6a DIAMETER interface and associated transactions.

The global opportunity presented by the IoT, while significant to the service provider community, also brings many new challenges. For example, as the number of connections originating from IoT devices and their associated applications dramatically increases over the next several years, a new set of technical requirements, including scalability, security, coverage, and roaming requirements, will need to be addressed so that the mobility core network platforms that transport such global IoT data can operate efficiently and effectively.

A significant amount of mobility core network signaling traffic is generated when large numbers of IoT devices try to attach to the mobility core network. These IoT devices, in addition to those associated with normal mobile users trying to access the same network for standard services such as voice and data, creates massive strain on network capacity.

Service providers need to be able to dynamically handle IoT traffic and potential traffic surges via intelligent controls in their network platforms carefully so that standard services are not impacted. This helps to minimize subscriber churn while maintaining steady revenue stream and paving the way for new revenue from IoT traffic.

DIAMETER is an authentication, authorization, and accounting ("AAA") protocol that works on the application layer of the Open Systems Interconnection ("OSI") model. DIAMETER supersedes RADIUS and provides several new features, including application layer acknowledgement, capability negotiation, and extensibility to add new features. DIAMETER is a message-based protocol, whereby end points exchange messages and receive positive or negative acknowledgements. DIAMETER protocol is well-documented in technical specifications such as those available from the Internet Engineering Task Force ("IETF"), particularly Request for Comments ("RFC") 6733 and related documents.

DIAMETER signaling traffic associated with IoT connections in a Long-Term Evolution ("LTE") network is transported between mobility management entity ("MME") and home subscriber server ("HSS") end points. Based on an operator's network architecture solution and design, such IoT DIAMETER traffic could be routed either directly between MMEs and HSSs or via a DIAMETER routing agent ("DRA"). In case of globally roaming IoT devices, an MME can route DIAMETER traffic from these IoT devices to a DRA that can re-route DIAMETER traffic to a target DIAMETER edge agent ("DEA") and its peered internetwork packet exchange ("IPX") hub en-route towards a home HSS to complete the transactions securely.

While static mapping can be utilized between MMEs and DRAs in a regional pooled configuration, such an approach may not be ideal for handling global IoT traffic. The visited MME that serves its home users as well as roamers needs to be able to extract the global IoT device identifiers, services, and priority access in being able to logically create an internal policy mapping of its overall subscriber data handling. It can then use that mapping to route the signaling traffic from such IoT devices to an IoT application-specific DRA.

The lack of such DIAMETER application layer routing intelligence via policy-based traffic steering for IoT devices within the MME may impact its internal and external DIAMETER transaction handling capability. The concepts and technologies disclosed herein address that problem via an intelligent tracking, mapping and closed-loop monitoring algorithm in the MME that can route the DIAMETER transactions based on IoT device identifiers, categories and their service priorities to an IoT application specific DRA. The DRA can then interwork with its peer nodes in the home and visited networks to successfully complete the IoT diameter transactions and associated services.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Turning now to FIG. 1, a block diagram illustrating a DIAMETER interface (known as the "S6a DIAMETER interface") 100 that facilitates DIAMETER message transactions among an MME 102, a DRA 104, and an HSS 106 will be described. The DIAMETER interface 100 is intended to provide context for the concepts and technologies disclosed herein. In particular, the concepts and technologies disclosed herein provide an IoT application-specific DRA that handles DIAMETER signaling traffic associated with IoT devices. The DIAMETER interface between the IoT application-specific DRA, MME(s), and HSS(s) remains the same, although changes are made to the routing tables utilized by the various components to ensure proper routing of DIAMETER signaling traffic in accordance with the concepts and technologies disclosed herein.

The MME 102 can be configured in accordance with Third Generation Partnership Project ("3GPP") standards specifications. The MME 102, in general, can perform operations to control DIAMETER signaling traffic related to mobility and security for radio access network ("RAN") access. The DRA 104 can be configured in accordance with 3GPP standards specifications. The DRA 104 is a functional element in a 3G or 4G (e.g., LTE) network that provides real-time routing capabilities to ensure that messages are routed among the correct elements within a network. DRAs were introduced by the 3GPP to address the increased DIAMETER signaling traffic and growing complexity of 4G LTE networks. The DRA 104 can provide real-time routing capabilities to ensure that DIAMETER signaling messages are routed to the correct resources in an evolved packet core ("EPC") network. The HSS 106 can be configured in accordance with 3GPP standards specifications. The HSS 106 is a database that contains user-related information for users of devices. The HSS 106 can provide support functions to the MME 102 for mobility management, call and session setup, user authentication, and access authorization.

The DIAMETER interface 100 can be utilized for the exchange of information between the MME 102 and the HSS 106. In accordance with the DIAMETER protocol, the DIAMETER interface 100 is utilized to authenticate subscribers, to provide services to subscribers, and to store location information of subscribers sent by the MME 102. This information can be exchanged via the following messages (generally shown as DIAMETER messages 108). An Authentication-Information-Request/Answer ("AIR/AIA") message can be utilized by the MME 102 to fetch authentication data from the HSS 106 to authenticate subscribers. An Update-Location-Request/Answer ("ULR/ULA") message can be utilized by the MME 102 to store its own identity at the HSS 106 and to fetch subscription data from the HSS 106. A Notification-Request/Answer message can be utilized by the MME 102 to store packet data network ("PDN") addresses and other attach information at the HSS 106. A Purge Request/Answer ("PRA") message can be utilized by the MME 102 to inform the HSS 106 that a device is inactive for a time and explains why the MME 102 has deleted the subscription data received in a previous ULR message. An Insert-Subscription-Data-Request/Answer ("IDR/IDA") message can be invoked by the HSS 106 when a subscriber is attached and a change has been made to the subscriber's profile stored in the HSS 106 and the same change is to be reflected at the subscriber profile stored at the MME 102 (sent via ULA message). A Delete-Subscriber-Data Request/Answer ("DSD") message can be invoked by the HSS 106 to inform the MME 102 of when a subscriber is attached and some data has been deleted at the HSS 106. A Cancel-Location-Request/Answer ("CLR/CLA") message can be invoked by the HSS 106 to detach subscribers. A Reset-Request/Answer ("RSR/RSA") can be invoked by the HSS 106 to inform the MME 102 that the HSS 106 has been disconnected and therefore requires resynchronization with the MME 102.

Figure 2:
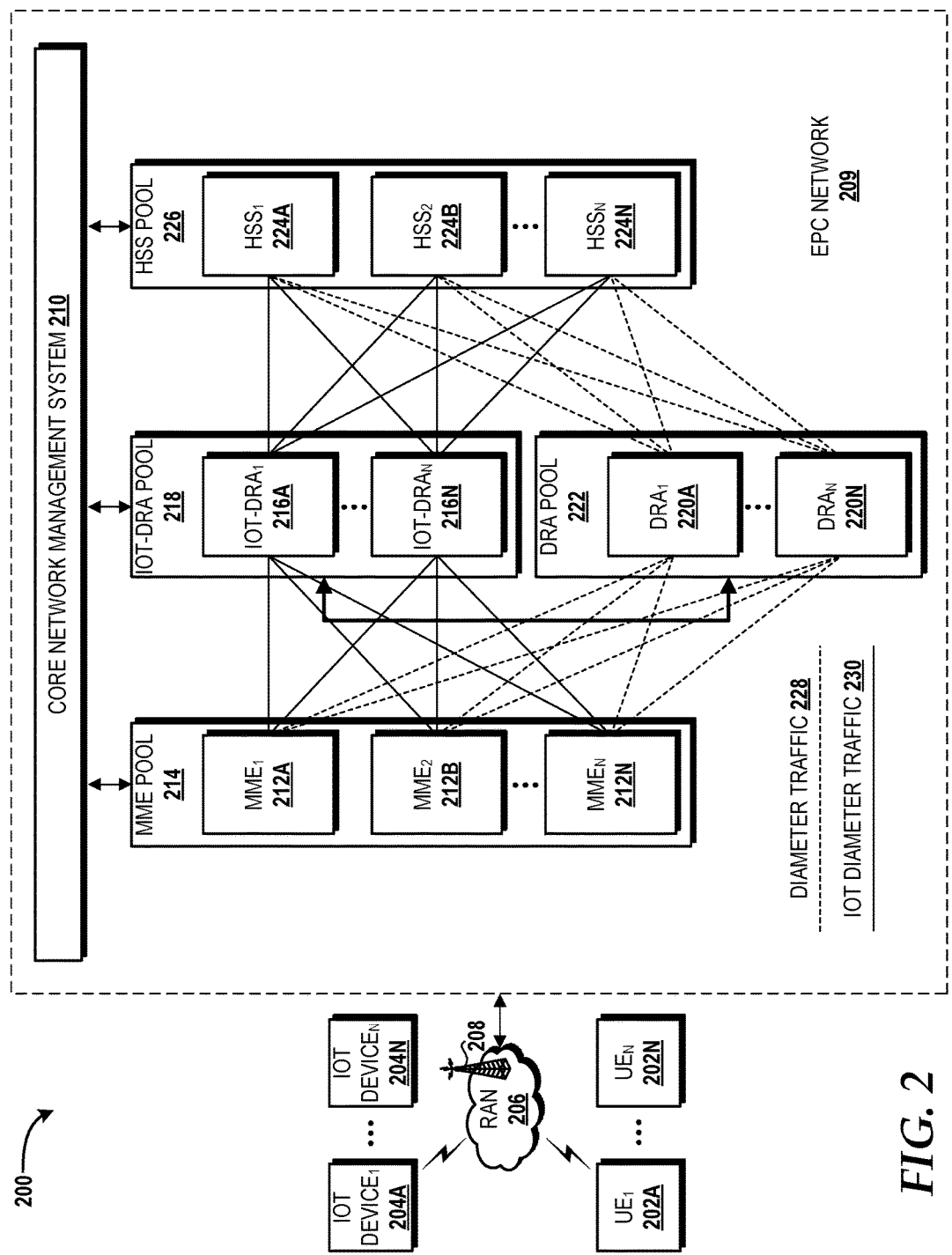
FIG. 2 is a block diagram illustrating a configuration for IoT DIAMETER traffic routing, according to an illustrative embodiment.

Turning now to FIG. 2, a pooled configuration 200 for IoT DIAMETER traffic routing will be described, according to an illustrative embodiment. The illustrated pooled configuration 200 includes a plurality of user equipment devices ("UEs") 202A-202N (referred to herein collectively as UEs 202, or in the singular form as UE 202) and a plurality of IoT devices 204A-204N (referred to herein collectively as IoT devices 204, or in the singular form as IoT device 204) operating in communication with a radio access network ("RAN") 206. The UEs 202 and the IoT devices 204 can communicate with the RAN 206 by way of one or more eNodeBs ("eNBs"), such as an eNB 208. Although only a single eNB 208 is shown, the RAN 206 can support multiple eNBs configured the same as or similar to the eNB 208.

Each of the UEs 202 can be a cellular phone, a feature phone, a smartphone, a mobile computing device, a tablet computing device, a portable television, a portable video game console, or the like capable of communicating with the RAN 206. Each of the IoT devices 204 can be a device that is network addressable to facilitate interconnectivity for the exchange of data. As such, the IoT devices 204 can be or can include any "thing" that is configured to be network addressable so as to connect to and communicate with one or more networks, such as the RAN 206, over which to communicate with other connected devices, including, for example, the UEs 202, computers, smartphones, tablets, vehicles, other M2M devices, servers, other networks, the Internet, combinations thereof, and the like. Moreover, the IoT devices 204 can be deployed for consumer use, business use, and can find application in many industry-specific use cases. For example, the IoT devices 204 may find at least partial application in the following industries: automotive; energy; healthcare; industrial; retail; and smart buildings/homes. Those skilled in the art will appreciate the applicability of IoT-solutions to other industries as well as consumer and business use cases. For this reason, applications of the IoT devices 204 described herein are used merely to illustrate some example applications of the IoT devices 204, and therefore should not be construed as being limiting in any way.

The RAN 206 can include one or more service areas ("cells") having the same or different cell sizes, which may be represented by different cell-types. As used herein, a "cell" refers to a geographical area that is served by one or more base stations operating within an access network. The cells within the RAN 206 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, and a white space network cell-type. For ease of explanation, a "small cell" cell-type is utilized herein to collectively refer to a group of cell-types that includes femto cell-type, pico cell-type, and micro cell-type, in general contrast to a macro cell-type, which offers a larger coverage area. Other cell-types, including proprietary cell-types and temporary cell-types are also contemplated. Although in the illustrated example, the UEs 202 and the IoT devices 204 are shown as being in communication with one RAN (i.e., the RAN 206), the UEs 202 and/or the IoT devices 204 may be in communication with any number of access networks, including networks that incorporate collocated wireless wide area network ("WWAN") WI-FI and cellular technologies, and as such, the UEs 202 and/or the IoT devices 204 can be dual-mode devices. Moreover, in some embodiments, the IoT devices 204 can communicate with a low power wide area network ("LPWAN") of which the RAN 206 might be a part.

The RAN 206 can operate in accordance with one or more radio access technologies ("RAT") that utilize mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 206 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 202 and the IoT devices 204. Data communications can be provided in part by the RAN 206 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 206 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the RAN 206 operating in accordance with LTE, although those skilled in the art will appreciate the applicability of the concepts and technologies disclosed herein to other cellular technologies, including, in particular, those captured within future generation 3GPP standards. Moreover, in some embodiments, the RAN 206 is or includes one or more virtual RANs ("vRANs").

As used herein, a "base station" refers to a radio receiver and/or transmitter (collectively, transceiver) that is/are configured to provide a radio/air interface over which one or more of the UEs 202 and the IoT devices 204, can connect to a network. Accordingly, a base station is intended to encompass one or more base transceiver stations ("BTSs"), one or more NBs, one or more eNBs (e.g., the eNB 208), one or more home eNBs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 202 and the IoT devices 204.

The RAN 206 is shown as being in communication with an evolved packet core ("EPC") network 209. The illustrated EPC network 209 includes a core network management system 210 that manages EPC resources. The EPC resources can be provided, at least in part, by physical network functions ("PNFs") having hardware and software components that facilitate voice and/or data communications with the UEs 202 and the IoT devices 204. The EPC resources can additionally or alternatively be provided, at least in part, by virtual network functions ("VNFs"). For example, the EPC resources can be realized as VNFs that utilize a unified commercial-off-the-shelf ("COTS") hardware and flexible resources shared model with the application software for the respective EPC resources running on one or more virtual machines ("VMs"). An example network virtualization platform ("NVP") architecture that might be used to implement various EPC resources embodied as VNFs is described herein below with reference to FIG. 8.

In the illustrated example, the core network management system 210 manages a plurality of MME resources ("MME$_1$, MME$_2$, ... MME$_N$") 212A-212N (referred to herein collectively as MMES 212, or in the singular form as MME 212) of an MME pool 214, a plurality of IoT application-specific DRA resources ("IoT-DRA$_1$, IoT-DRA$_N$") 216A-216N (referred to herein collectively as IoT-DRAs 216, or in the singular form as IoT-DRA 216) of an IoT application-specific DRA pool ("IoT-DRA pool") 218, a plurality of DRA resources ("DRA$_1$ ... DRA$_N$") 220A-220N of a DRA pool 222, and a plurality of HSS resources ("HSS$_1$, HSS$_2$, ... HSS$_N$") 224A-224N (referred to herein collectively as HSSs 224, or in the singular form as HSS 224) of an HSS pool 226. Although three MMEs 212, two IoT DRAs 216, two DRAs 220, and three HSSs 224 are illustrated, the MME pool 214, the IoT-DRA pool 218, the DRA pool 222, and the HSS pool 226 can include any number of associated resources, and as such, the illustrated example should not be construed as being limiting in any way.

The MMEs 212 can be configured in accordance with 3GPP standards specifications. The MMEs 212, in general, can perform operations to control signaling traffic related to mobility and security for RAN access, such as access by the UEs 202 and IoT devices 204 to the EPC network 209 via the RAN 206 (or others not shown). In particular, the MMEs 212 manage authentication and authorization for the UEs 202 and the IoT devices 204 for access to the EPC network 209 and to gain IP connectivity for access to other PDNs (not shown). The MMEs 212 coordinate with the HSSs, via a DIAMETER S6a interface (such as the DIAMETER shown in FIG. 1) and the RAN 206 to determine the appropriate radio resource management strategy for each of the UEs 202 and the IoT devices 204 during the attachment process. The MMEs 212 provide mobility management operations for inter-eNB and inter-RAT communications. The MMEs 212 also support roaming devices from other networks (not shown). The MMEs 212 manage communications between the UEs 202/IoT devices 204 and the HSSs 224 to locate and determine reachability and activity-related information. The MMEs 212 allocate and reallocate tracking area identity ("TAI") lists to the UEs 202/IoT devices 204. The MMEs 212 can perform other operations consistent with 3GPP standards specifications, and as such, additional details are not provided herein.

The DRAs 220 can be configured in accordance with 3GPP standards specifications. The DRAs 220 provide real-time routing capabilities to ensure that DIAMETER signaling messages are routed to the correct resources in the EPC network 209. In the illustrated example, DIAMETER traffic associated with the UEs 202 (DIAMETER traffic 228) is shown by the dashed lines between the MME pool 214, the DRA pool 222, and the HSS pool 226.

The IoT-DRAs 216 also can be configured in accordance with 3GPP standards specifications. The IoT-DRAs 216, however, provide a dedicated set of DRAs to handle routing of DIAMETER signaling messages associated with the IoT devices 204. In the illustrated example, DIAMETER traffic associated with the IoT devices 204 (IoT DIAMETER traffic 230) is shown by the solid lines between the MME pool 214, the IoT-DRA pool 218, and the HSS pool 226.

The HSSs 224 can be configured in accordance with 3GPP standards specifications. The HSSs 224 are databases that contain user-related information for users of the UEs 202 and the IoT devices 204. The HSSs 224 can provide support functions to the MMES 212 for mobility management, call and session setup, user authentication, and access authorization.

Although not shown in the illustrated example, the EPC network 209 can additionally include one or more service gateways ("SGWs"), one or more packet data network ("PDN") gateways ("PGWs"), one or more S/PGWs, one or more policy and charging rules functions ("PCRFs"), or some combination thereof. Moreover, these resources can be pooled in a manner similar to that of the MME, DRA, IoT-DRA, and HSS pools described above, and can be managed similarly by the core network management system 210.

The SGWs provide a point of interconnect between the radio-side (e.g., the RAN 206) and the EPC network 209. The SGWs can serve the UEs 202 and the IoT devices 204 by routing incoming and outgoing IP packets. The PGWs interconnect the EPC network 209 and one or more external IP networks, such as, for example, the Internet or one or more PDNs (both not shown in the illustrated example). The PGWs can route IP packets to and from the external IP networks. The PGWs also perform operations such as IP address/IP prefix allocation, policy control, and charging. In some implementations, a PGW and an SGW are deployed as a combined entity. The EPC network 209 can include other network elements not shown in the illustrated embodiment. As such, the illustrated embodiment should not be construed as being limiting in any way. The PCRFs can be configured in accordance with 3GPP standards specifications. The PCRFs can determine policy rules, detect service data flows, enforce policies, and perform flow-based charging.

The IoT devices 204 connect to the EPC network 209 via the RAN 206 by first attaching to a serving MME (i.e., one of the MMES 212). As part of the attach and/or TAU process, the serving MME completes authentication and update location DIAMETER transactions with a serving HSS (i.e., one of the HSSs 224). The IoT devices 204 connectivity between the serving MME and the serving HSS can be established either directly in a peered mode of operation, or, as in the illustrated embodiment, via one of the IOT-DRAs 216, as an intermediate routing agent.

In the illustrated example, the EPC network 209 provides a pooled network architecture for providing voice and data services to the UEs 202. Moreover, the illustrated embodiment shows the MME pool 214, the IoT-DRA pool 218, the DRA pool 222, and the HSS pool 226 as being interconnected in a fully-meshed and geo-redundant configuration to be able to provide a resilient connectivity path in case of nodal, link, and/or underlying transport layer failures. However, this configuration alone might not be optimal for handling IoT traffic to/from the IoT devices 204. For this reason, the concepts and technologies disclosed herein, and as shown in the illustrated example, provide a dedicated set of DRAs—that is, the IoT-DRAs 216—operating in the IoT-DRA pool 218.

As the volume of the IoT DIAMETER traffic 230 associated with the IoT devices 204 grows rapidly in comparison with traditional mobile voice and data traffic (such as associated with the UEs 202), with the maturity of category 1 ("CAT1")/CAT0/CATM based cost-effective machine-type communication devices, the core network elements (e.g., the MMES 212 and the HSSs 224) might not be able to keep up with the scaling demand of IoT services emanating from the IoT devices 204 across several industry verticals. When the IoT devices 204 try to attach to one of the MMES 212, the serving MME can route the IoT DIAMETER traffic 230 from the IoT devices 204 towards the IoT DRAs 216 based upon internal mapping and routing logic. For example, the MME 212 can be pre-configured with internal mappings and routing logic to the IoT DRAs 216 for handling the IoT DIAMETER traffic 230. Based upon such static mapping, the MME 212 can route the IoT DIAMETER traffic 230 to a given DRA, HSS, or both based on the operator's network topology design and engineering rules that govern a specific deployment strategy.

If the volume of the IoT devices 204 grows to be large enough in a given regional network coverage area and the IoT devices 204 try to reconnect simultaneously to the MME pool 214 that is handling incumbent mobility subscribers (e.g., users of the UEs 202), this could result in a signaling storm. In such situations, a static logical mapping of peer DRA/HSS nodes within the MMEs 212, such as described above, is not helpful to meet the dynamic routing needs of the IoT DIAMETER traffic 230. Moreover, a lack of proper IoT device identification, category, priority, and correlated mapping in the MMEs 212, in addition to IoT application-specific and context-aware routing towards the IoT-DRAs 216 can result in mobility services impact and outages during disaster situations. Such service outage situations should be averted in the network via intelligent IoT policy-based routing to maintain high quality customer experience.

In the illustrated embodiment, the assumption is that all the MMEs 212 in the MME pool 214 have connectivity towards the IoT-DRAs 216 in the IoT-DRA pool 218 to handle the IoT DIAMETER traffic 230 as well as connectivity towards the DRAs 220 in the DRA pools 222 to handle the DIAMETER traffic 228 associated with the UEs 202. In some embodiments, the IoT-DRAs 216 can leverage the DRAs 220 as a fall back mechanism via high-speed inter-DRA links in case of IoT signaling storms that could potentially result in overload triggers in the IoT-DRAs 216. In such situations, the IoT-DRAs 216, based upon internal analysis of available resources, traffic utilization, context awareness, priority, and application type, can selectively discard low priority DIAMETER messages while maintaining higher priority DIAMETER messages, such as those in the IoT DIAMETER traffic 230. If the MMEs 212 do not have adequate egress controls for the IoT DIAMETER traffic 230, and if the MMEs 212 continue to route the IoT DIAMETER traffic 230 to the IoT-DRAs 216, the IoT-DRAs 216 can accept the IoT DIAMETER traffic 230 and can utilize pattern analysis to selectively route high priority DIAMETER messages in the IoT DIAMETER traffic 230 to the DRAs 220 in a round robin manner to ensure IoT signaling service continuity. The IoT-DRAs 216 can discard, queue, or delay DIAMETER messages in the IoT DIAMETER traffic 230 based on their relative priority for later processing when the affected node(s) recover(s). If, however, the MMEs 212 have adequate egress controls for the IoT DIAMETER traffic 230, the MMEs 212 can selectively throttle low priority DIAMETER messages in the IoT DIAMETER traffic 230, while accepting high priority DIAMETER messages in the IoT DIAMETER traffic 230 so as to regulate the flow of traffic to a peer IoT-DRA in the IoT-DRA pool 218, and by doing so, the IoT-DRAs 216 are protected from the controlled rate of signaling events at the MMEs 212.

Figure 3:
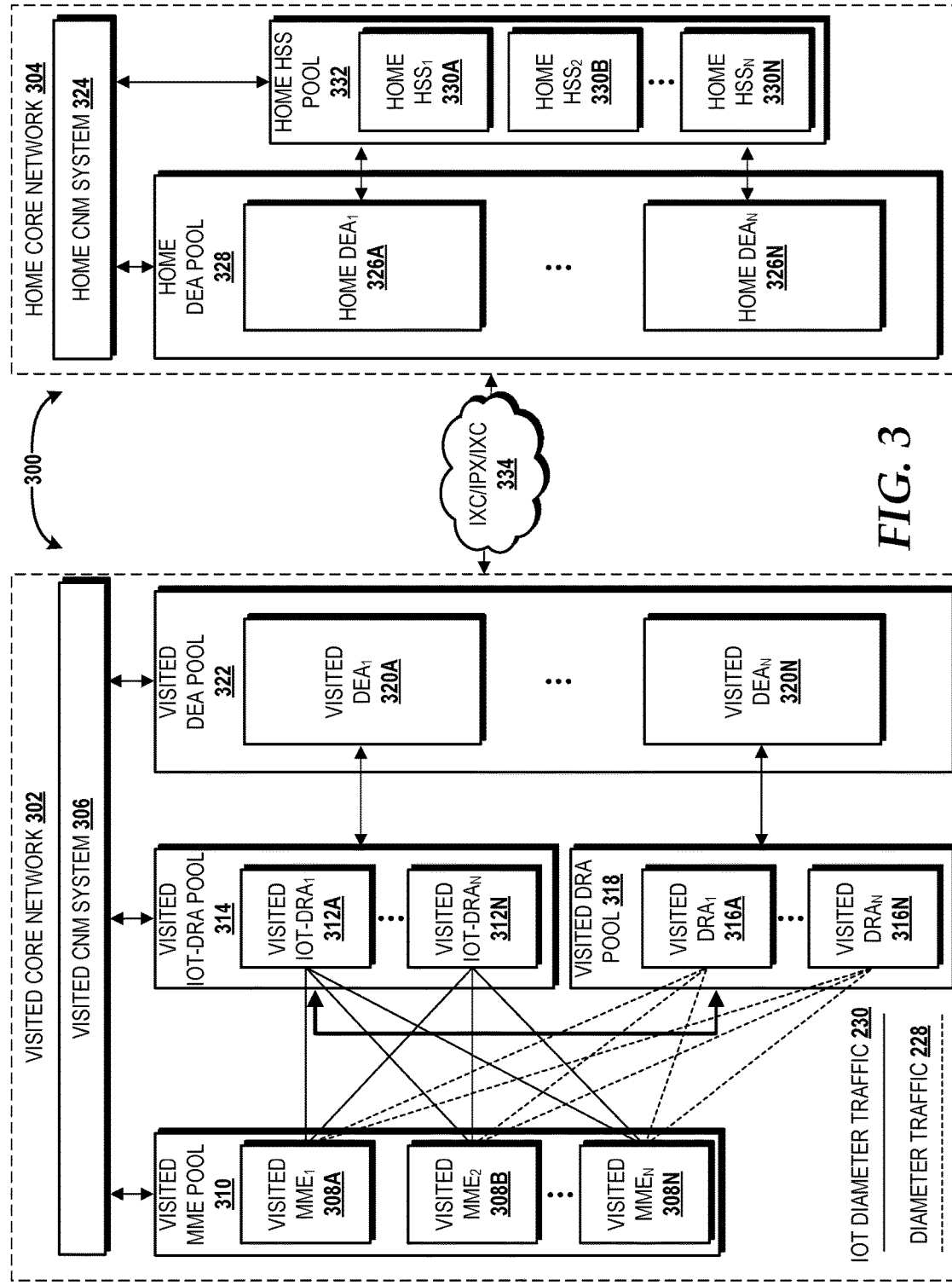
FIG. 3 is a block diagram illustrating a configuration for IoT DIAMETER traffic routing among public land mobile networks ("PLMNs"), according to an illustrative embodiment.

Turning now to FIG. 3, a configuration 300 for IOT DIAMETER traffic routing among PLMNs will be described, according to an illustrative embodiment. The illustrated configuration 300 includes a visited core network 302 and a home core network 304 of a visited PLMN and a home PLMN, respectively. The visited core network 302 includes a visited core network management ("CNM") system 306 that manages a plurality of visited MME resources ("visited $MME_1$, visited $MME_2$, . . . visited $MME_N$") 308A-308N (referred to herein collectively as visited MMEs 308, or in the singular form as visited MME 308) of a visited MME pool 310, a plurality of visited IoT-specific DRA resources ("visited $IoT-DRA_1$, visited $IoT-DRA_2$, . . . visited $IoT-DRA_N$") 312A-312N (referred to herein collectively as visited IoT-DRAs 312, or in the singular form as visited IoT-DRA 312) of a visited IoT-specific DRA pool 314, a plurality of visited DRA resources ("visited $DRA_1$ . . . visited $DRA_N$") 316A-316N of a visited DRA pool 318, and a plurality of visited DIAMETER edge agents ("DEA") resources ("visited $DEA_1$ . . . visited $DEA_N$") 320A-320N (referred to herein collectively as visited DEAs 320, or in the singular form as visited DEA 320) of a visited DEA pool 322. Although three visited MMEs 308, two visited IoT-DRAs 312, two visited DRAs 316, and two visited DEAs 320 are illustrated, the visited MME pool 310, the visited IoT-DRA pool 314, and the visited DEA pool 322 can include in any number of related resources, and as such, the illustrated example should not be construed as being limiting in any way.

The home core network 304 includes a home CNM management system 324 that manages a plurality of home DEA resources ("home $DEA_1$ . . . home $DEA_N$") 326A-326N (referred to herein collectively as home DEAs 326, or in the singular form as home DEA 326) of a home DEA pool 328 and a plurality of home HSS resources ("$HSS_1$, $HSS_2$, . . . $HSS_N$") 330A-330N (referred to herein collectively as home HSSs 330, or in the singular form as home HSS 330) of a home HSS pool 332. Although two home DEAs 326 and three home HSSs 330 are illustrated, the home DEA pool 328 and the home HSS pool 332 can include in any number of associated resources, and as such, the illustrated example should not be construed as being limiting in any way.

The visited MMEs 308 can be configured in accordance with 3GPP standards specifications. The visited MMEs 308, in general, can perform operations to control signaling traffic related to mobility and security for RAN access, such as access by the UEs 202 and IoT devices 204 via one or more RANs (such as the RAN 206 best shown in FIG. 2). In particular, the visited MMEs 308 manage authentication and authorization for the UEs 202 and the IoT devices 204 for access to the visited core network 302 and to gain IP connectivity for access to other PDNs (not shown). The visited MMEs 308 coordinate with the home HSSs 330 and the RANs to determine the appropriate radio resource management strategy for each of the UEs 202 and the IoT devices 204 during the attachment process. The visited MMEs 308 provide mobility management operations for inter-eNB and inter-RAT communications. The visited MMEs 308 also support roaming devices from other networks (e.g., the home core network 304). The visited MMEs 308 manage communications between the UEs 202/IoT devices 204 and the home HSSs 330, via the visited IoT-DRA 312, the visited DRAs 316, the visited DEAs 320, and the home DEAs 326 to locate and determine reachability and activity-related information. The visited MMEs 308 allocate and reallocate TAI lists to the UEs 202/IoT devices 204. The visited MMEs 308 can perform other operations consistent with 3GPP standards specifications, and as such, additional details are not provided herein.

The visited DRAs 316 can be configured in accordance with 3GPP standards specifications. The visited DRAs 316 provide real-time routing capabilities to ensure that DIAMETER signaling messages are routed to the correct resources in the visited core network 302. In the illustrated example, DIAMETER traffic associated with the UEs 202 (DIAMETER traffic 228) is shown by the dashed lines between the visited MME pool 310, and the visited DRA pool 318.

The visited IoT-DRAs 312 also can be configured in accordance with 3GPP standards specifications. The visited IoT-DRAs 312, however, provide a dedicated set of DRAs to handle routing of DIAMETER signaling messages associated with the IoT devices 204. In the illustrated example, DIAMETER traffic associated with the IoT devices 204 (IoT DIAMETER traffic 230) is shown by the solid lines between the visited MME pool 310 and the visited IoT-DRA pool 314.

The visited DEAs 320 can be configured in accordance with 3GPP standards specifications. The visited DEAs 320 provide a point of contact into and out of the visited core network 302 at the DIAMETER application level. The visited DEAs 320 provide secure communications to connect the visited core network 302 to the home core network 304 via one or more interexchange carrier ("IXC") networks and one or more internetwork packet exchange ("IPX") networks (shown collectively as IXC/IPX/IXC 334) to facilitate internetwork operations (e.g., roaming, charging, and billing) between the visited PLMN and the home PLMN. The visited DEAs 320 enable DIAMETER signaling traffic to flow between the visited core network 302 and the home core network 304, particularly the home DEAs 326 while also disguising the topology of the visited core network 302 and the home core network 304.

Similarly, the home DEAs 326 can be configured in accordance with 3GPP standards specifications. The home DEAs 326 provide a point of contact into and out of the home core network 304 at the DIAMETER application level. The home DEAs 326 provide secure communications to connect the home core network 304 to the visited core network 302 via the IXC/IPX/IXC 334 to facilitate internetwork operations (e.g., roaming, charging, and billing). The home DEAs 326 enable DIAMETER signaling traffic to flow between the visited core network 302 and the home core network 304, particularly the home DEAs 326 while also disguising the topology of the visited core network 302 and the home core network 304.

The home HSSs 330 can be configured in accordance with 3GPP standards specifications. The home HSSs 330 are databases that contain user-related information for users of the UEs 202 and the IoT devices 204 (best shown in FIG. 2).

The home HSSs 330 can provide support functions to the visited MMEs 308 for mobility management, call and session setup, user authentication, and access authorization.

The static core network configuration and mapping methods defined between MME-DRA-HSS, such as illustrated and described above with reference to FIG. 2, might not be adequate to meet the demands of growing IoT DIAMETER signaling traffic (i.e., the IoT DIAMETER traffic 230). Although these core network elements can be deployed in regionally distributed geo-redundant data centers to ease the signaling from the UEs 202, these are not be able to handle the additive IoT signaling storms as a result of simultaneous reconnections resulting from network element or transport or regional data center failures causing undesirable signaling connectivity between peer nodes. By providing the dedicated set of DRA resources in the visited IoT-DRA pool 314 for handling the IoT DIAMETER traffic 230, the concepts and technologies disclosed herein are able to prevent or at least mitigate the effects of IoT signaling storms.

In addition to the IoT DIAMETER signaling traffic in home PLMNs handled by regional MMEs, global IoT roaming DIAMETER signaling traffic poses new challenges to such MMEs in visited PLMNs. DIAMETER signaling traffic resulting from IoT-application specific from home users and roaming users can impact the overall signaling ingress into MMEs. Without adequate IoT application-specific policy driven signaling routing, MMEs can become saturated, resulting in downstream signaling impacts to DRA and HSS nodes. Such extreme signaling storms can cause nodal as well as network wide localized datacenter outages, traditional mobility service disruptions, and IoT-specific service impacts in certain areas. For some industry verticals and emergency/public safety situations, lack of adequate network and service level continuity in a dynamic mobility networking environment might be fatal.

To minimize and/or to prevent such adverse IoT service impacts for home and global roaming traffic being handled in a visited PLMN, the MME signaling routing algorithm for IoT application-specific traffic can be enhanced to take into account the IoT devices identification such as the use of International Mobile Subscriber Identity ("IMSI"), Mobile Station International Subscriber Directory Number ("MSISDN"), International Mobile Equipment Identity ("IMEI"), a combination IMSI/IMEI, and/or any other device-specific ID as well as the device category supported in the network capability and priority indication for access into the network. The device category can identify the device as being a UE, such as one of the UEs 202, or an IoT device, such as one of the IoT devices 204.

With such intelligence being captured on a per IoT device basis as part of the attachment process and the IoT specific context that the MME creates in its VLR, the MME can synthesize the device's mapping information along with the peer network element connectivity path. The MME can use this information to intelligently route the IoT device signaling to IoT services DRA. The DRA can route based on specific service/application type to its peer HSS node so that the critical transactions could be completed.

In the illustrated embodiment, the assumption is that all the visited MMEs 308 in the visited MME pool 310 have connectivity towards the visited IoT-DRAs 312 in the visited IoT-DRA pool 314 to handle the IoT DIAMETER traffic 230 as well as connectivity towards the visited DRAs 316 in the visited DRA pools 318 to handle the DIAMETER traffic 228 associated with the UEs 202. In some embodiments, the visited IoT-DRAs 312 can leverage the visited DRAs 316 as a fall back mechanism via high-speed inter-DRA links in case of IoT signaling storms that could potentially result in overload triggers in the visited IoT-DRAs 312. In such situations, the visited IoT-DRAs 312, based upon internal analysis of available resources, traffic utilization, context awareness, priority, and application type, can selectively discard low priority DIAMETER messages while maintaining higher priority DIAMETER messages, such as those in the IoT DIAMETER traffic 230. If the visited MMEs 308 do not have adequate egress controls for the IoT DIAMETER traffic 230, and if the visited MMEs 308 continue to route the IoT DIAMETER traffic 230 to the visited IoT-DRAs 312, the visited IoT-DRAs 312 can accept the IoT DIAMETER traffic 230 and can utilize pattern analysis to selectively route high priority DIAMETER messages in the IoT DIAMETER traffic 230 to the visited DRAs 316 in a round robin manner to ensure IoT signaling service continuity. The visited IoT-DRAs 312 can discard, queue, or delay DIAMETER messages in the IoT DIAMETER traffic 230 based on their relative priority for later processing when the affected node(s) recover(s). If, however, the visited MMEs 308 have adequate egress controls for the IoT DIAMETER traffic 230, the visited MMEs 308 can selectively throttle low priority DIAMETER messages in the IoT DIAMETER traffic 230, while accepting high priority DIAMETER messages in the IoT DIAMETER traffic 230 so as to regulate the flow of traffic to a peer IoT-DRA in the visited IoT-DRA pool 314, and by doing so, the visited IoT-DRAs 312 are protected from the controlled rate of signaling events at the visited MMEs 308.

Figure 4:
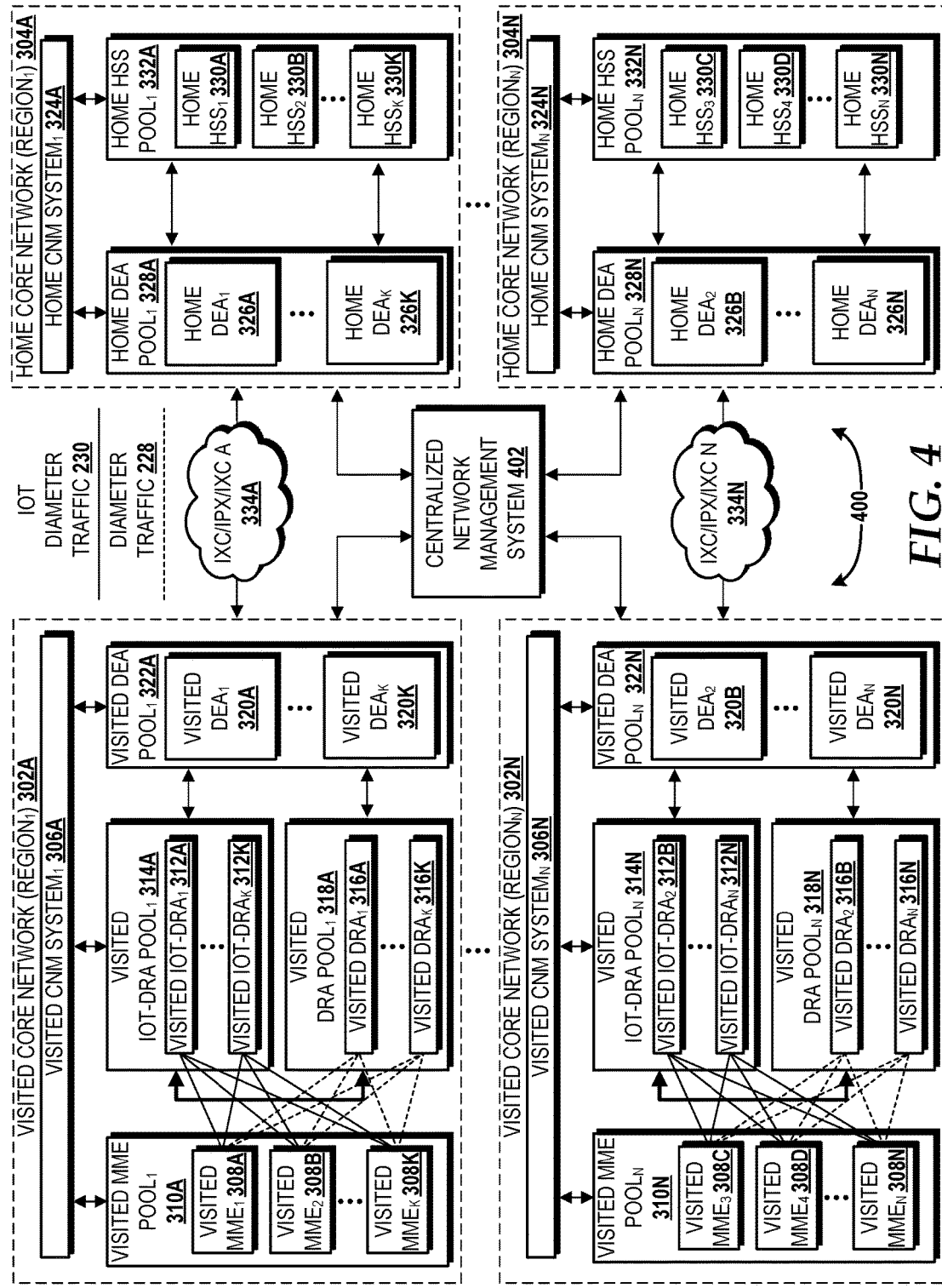
FIG. 4 is a block diagram illustrating another configuration for IoT DIAMETER traffic routing among PLMNs, according to an illustrative embodiment.

Turning now to FIG. 4, a configuration 400 for IoT DIAMETER traffic routing among regional pools between PLMNs will be described, according to an illustrative embodiment. The illustrated configuration 400 includes the visited core network 302 and the home core network 304 of a visited PLMN and a home PLMN, respectively, as first introduced in FIG. 3. In the configuration 400, the visited core network 302 is divided into a plurality of visited network regions (visited network region$_1$-visited network region$_N$ 302A-302N) and the home core network 304 is divided into a plurality of home network regions (home network region$_1$-home network region$_N$ 304A-304N). Each of the regions include regional pools of core network resources.

The visited core network (region$_1$) 302A includes a visited CNM system$_1$ 306A that manages a plurality of visited MME resources ("visited MME$_1$, visited MME$_2$, ... visited MME$_K$") 308A-308K (referred to herein collectively as visited MMEs 308, or in the singular form as visited MME 308) of a visited MME pool$_1$ 310A, a plurality of visited IoT-specific DRA resources ("visited IoT-DRA$_1$ ... visited IoT-DRA$_K$") 312A-312K (referred to herein collectively as visited IoT-DRAs 312, or in the singular form as visited IoT-DRA 312) of a visited IoT-specific DRA pool$_1$ 314A, a plurality of visited DRA resources ("visited DRA$_1$ ... visited DRA$_K$") 316A-316K of a visited DRA pool$_1$ 318A, and a plurality of visited DEA resources ("visited DEA$_1$ ... visited DEA$_K$") 320A-320K (referred to herein collectively as visited DEAs 320, or in the singular form as visited DEA 320) of a visited DEA pool$_1$ 322A. Although three visited MMEs 308 are shown in the visited MME pool$_1$ 310A, two visited IoT-DRAs 312 are shown in the visited IoT-DRA pool$_1$ 314A, two visited DRAs 316 are shown in the visited DRA pool$_1$ 318A, and two visited DEAs 320 are shown in the visited DEA pool$_1$ 322A in the illustrated embodiment, the visited MME pool$_1$ 310A, the visited IoT-DRA pool$_1$ 314A, and the visited DEA pool$_1$ 322A can include any number of related resources, and as such, the illustrated example should not be construed as being limiting in any way.

Similarly, the visited core network (region$_N$) 302N includes a visited CNM system$_N$ 306N that manages another plurality of visited MME resources ("visited MME$_3$, visited MME$_4$, ... visited MME$_N$") 308C-308N (referred to herein collectively as visited MMEs 308, or in the singular form as visited MME 308) of a visited MME pool$_N$ 310N, another plurality of visited IoT-specific DRA resources ("visited IoT-DRA$_2$ ... visited IoT-DRA$_N$") 312B-312N (referred to herein collectively as visited IoT-DRAs 312, or in the singular form as visited IoT-DRA 312) of another visited IoT-specific DRA pool$_N$ 314N, another plurality of visited DRA resources ("visited DRA$_1$ ... visited DRA$_N$") 316B-316N of a visited DRA pool$_N$ 318N, and another plurality of visited DEA resources ("visited DEA$_2$ ... visited DEA$_N$") 320A-320N (referred to herein collectively as visited DEAs 320, or in the singular form as visited DEA 320) of another visited DEA pool$_N$ 322N. Although three visited MMEs 308 are shown in the visited MME pool$_N$ 310N, two visited IoT-DRAs 312 are shown in the visited IoT-DRA pool$_N$ 314N, two visited DRAs 316 are shown in the visited DRA pool$_N$ 318N, and two visited DEAs 320 are shown in the visited DEA pool$_N$ 322N in the illustrated embodiment, the visited MME pool$_N$ 310N, the visited IoT-DRA pool$_N$ 314N, and the visited DEA pool$_N$ 322N can include any number of related resources, and as such, the illustrated example should not be construed as being limiting in any way.

The home core network (region$_1$) 304A includes a CNM management system$_1$ 324A that manages a plurality of home DEA resources ("home DEA$_1$ ... home DEA$_K$") 326A-326K (referred to herein collectively as home DEAs 326, or in the singular form as home DEA 326) of a home DEA pool$_1$ 328A and a plurality of home HSS resources ("HSS$_1$, HSS$_2$, ... HSS$_K$") 330A-330K (referred to herein collectively as home HSSs 330, or in the singular form as home HSS 330) of a home HSS pool$_1$ 332A. Although two home DEAs 326 are shown in the home DEA pool$_1$ 328A and three home HSSs 330 are shown in the home HSS pool$_1$ 332A in the illustrated embodiment, the home DEA pool$_1$ 328A and the home HSS pool$_1$ 332A can include in any number of associated resources, and as such, the illustrated example should not be construed as being limiting in any way.

The home core network (region$_N$) 304N includes a CNM management system$_N$ 324N that manages another plurality of home DEA resources ("home DEA$_2$ ... home DEA$_N$") 326B-326N (referred to herein collectively as home DEAs 326, or in the singular form as home DEA 326) of a home DEA pool$_N$ 328N and another plurality of home HSS resources ("HSS$_3$, HSS$_4$, ... HSS$_N$") 330C-330N (referred to herein collectively as home HSSs 330, or in the singular form as home HSS 330) of a home HSS pool$_N$ 332N. Although two home DEAs 326 are shown in the home DEA pool$_N$ 328N and three home HSSs 330 are shown in the home HSS pool$_N$ 332N in the illustrated embodiment, the home DEA pool$_N$ 328N and the home HSS pool$_N$ 332N can include in any number of associated resources, and as such, the illustrated example should not be construed as being limiting in any way.

The visited MMEs 308 arranged in the configuration 400 can be configured in accordance with 3GPP standards specifications. The visited MMEs 308, in general, can perform operations to control signaling traffic related to mobility and security for RAN access, such as access by the UEs 202 and IoT devices 204 via one or more RANs (such as the RAN 206 best shown in FIG. 2). In particular, the visited MMEs 308 manage authentication and authorization for the UEs 202 and the IoT devices 204 for access to one or more regions of the visited core network 302A-302N and to gain IP connectivity for access to other PDNs (not shown). The visited MMEs 308 coordinate with the home HSSs 330 and the RANs to determine the appropriate radio resource management strategy for each of the UEs 202 and the IoT devices 204 during the attachment process. The visited MMEs 308 provide mobility management operations for inter-eNB and inter-RAT communications. The visited MMEs 308 also support roaming devices from other networks (e.g., the home core network 304). The visited MMEs 308 manage communications between the UEs 202/IoT devices 204 and the home HSSs 330, via the visited IoT-DRAs 312, the visited DRAs 316, the visited DEAs 320, and the home DEAs 326 to locate and determine reachability and activity-related information. The visited MMEs 308 allocate and reallocate TAI lists to the UEs 202/IoT devices 204. The visited MMEs 308 can perform other operations consistent with 3GPP standards specifications, and as such, additional details are not provided herein.

The visited DRAs 316 arranged in the configuration 400 can be configured in accordance with 3GPP standards specifications. The visited DRAs 316 provide real-time routing capabilities to ensure that DIAMETER signaling messages are routed to the correct resources in one or more regions of the visited core network 302A-302N. In the illustrated example, DIAMETER traffic associated with the UEs 202 (DIAMETER traffic 228) is shown by the dashed lines between MMEs in the visited MME pools 310A-310N and the visited DRA pools 318A-318N.

The visited IoT-DRAs 312 arranged in the configuration 400 can be configured in accordance with 3GPP standards specifications. The visited IoT-DRAs 312, however, provide a dedicated set of DRAs to handle routing of DIAMETER signaling messages associated with the IoT devices 204. In the illustrated example, DIAMETER traffic associated with the IoT devices 204 (IoT DIAMETER traffic 230) is shown by the solid lines between MMEs in the visited MME pools 310A-310N and the visited IoT-DRA pools 314A-314N.

The visited DEAs 320 arranged in the configuration 400 can be configured in accordance with 3GPP standards specifications. The visited DEAs 320 provide a point of contact into and out of one or more regions of the visited core network 302A-302N at the DIAMETER application level. The visited DEAs 320 provide secure communications to connect one or more regions of the visited core network 302A-302N to the home core network 304 via one or more IXC/IPX/IXC 334A-334N to facilitate internetwork operations (e.g., roaming, charging, and billing) between the visited PLMN and the home PLMN. The visited DEAs 320 enable DIAMETER signaling traffic to flow between one or more regions of the visited core network 302A-302N and one or more regions of the home core network 304, particularly the home DEAs 326 while also disguising the topology of the visited core network 302A-302N and the home core network 304A-304N.

Similarly, the home DEAs 326 arranged in the configuration 400 can be configured in accordance with 3GPP standards specifications. The home DEAs 326 provide a point of contact into and out of the home core network 304 at the DIAMETER application level. The home DEAs 326 provide secure communications to connect one or more regions of the home core network 304A-304N to one or more regions of the visited core network 302A-302N via the IXC/IPX/IXC 334A-334N to facilitate internetwork operations (e.g., roaming, charging, and billing). The home DEAs 326 enable DIAMETER signaling traffic to flow between one or more regions of the visited core network 302A-302N and one or more regions of the home core network 304A-304N, particularly the home DEAs 326 while also disguising the topology of the visited core network 302A-302N and the home core network 304A-304N.

The home HSSs 330 arranged in the configuration 400 can be configured in accordance with 3GPP standards specifications. The home HSSs 330 are databases that contain user-related information for users of the UEs 202 and the IoT devices 204 (best shown in FIG. 2). The home HSSs 330 can provide support functions to the visited MMES 308 for mobility management, call and session setup, user authentication, and access authorization.

The configuration 400 also includes a centralized network management system 402. The centralized network management system 402 manages the CNM systems 306A-306N/324A-324N. The centralized network management system 402 can orchestrate operations performed by the CNM systems 306A-306N/324A-324N to dynamically allocate and/or alter resource utilization on-demand within one or more of the resource pools disclosed herein during the course of network changes or upgrades, error conditions, failover situations, and the like.

In the illustrated embodiment, the assumption is that all the visited MMEs 308 in the visited MME pools 310A-310N have connectivity towards the visited IoT DRAs 312 in the visited IoT-DRA pools 314A-314N to handle the IoT DIAMETER traffic 230 as well as connectivity towards the visited DRAs 316 in the visited DRA pools 318 to handle the DIAMETER traffic 228 associated with the UEs 202. In some embodiments, the visited IoT-DRAs 312 can leverage the visited DRAs 316 as a fall back mechanism via high-speed inter-DRA links in case of IoT signaling storms that could potentially result in overload triggers in the visited IoT-DRAs 312. In such situations, the visited IoT-DRAs 312, based upon internal analysis of available resources, traffic utilization, context awareness, priority, and application type, can selectively discard low priority DIAMETER messages while maintaining higher priority DIAMETER messages, such as those in the IoT DIAMETER traffic 230. If the visited MMEs 308 do not have adequate egress controls for the IoT DIAMETER traffic 230, and if the visited MMEs 308 continue to route the IoT DIAMETER traffic 230 to the visited IoT-DRAs 312, the visited IoT-DRAs 312 can accept the IoT DIAMETER traffic 230 and can utilize pattern analysis to selectively route high priority DIAMETER messages in the IoT DIAMETER traffic 230 to the visited DRAs 316 in a round robin manner to ensure IoT signaling service continuity. The visited IoT-DRAs 312 can discard, queue, or delay DIAMETER messages in the IoT DIAMETER traffic 230 based on their relative priority for later processing when the affected node(s) recover(s). If, however, the visited MMEs 308 have adequate egress controls for the IoT DIAMETER traffic 230, the visited MMEs 308 can selectively throttle low priority DIAMETER messages in the IoT DIAMETER traffic 230, while accepting high priority DIAMETER messages in the IoT DIAMETER traffic 230 so as to regulate the flow of traffic to a peer IoT-DRA in the visited IoT-DRA pools 314A-314N, and by doing so, the visited IoT-DRAs 312 are protected from the controlled rate of signaling events at the visited MMEs 308.

In the regionalized data center model (such as the configuration 400), where the MME-DRA-HSS resources are pooled, the IoT DIAMETER traffic 230 is contained within a given pool region. In disaster situations where an entire region (e.g., region₁ or region in the illustrated example) is impacted due to DRA failures, the visited MMEs 308 can intelligently learn of the peer node and link status and health status of the secondary regional IoT DRAB (e.g., the visited IOT-DRAs 312B-312N) via the centralized network management system 402 and establish routes to those DRAs/HSSs for service continuity. The visited MMEs 308 can proactively monitor and can utilize policy-based analysis of peer nodes within the visited IoT-DRA pools 314A-314N via a combination of local and global management systems (i.e., the visited CNM systems 306A-306N and the centralized network management system 402) and intelligent IoT application specific routing to meet the dynamic scaling demands of the IoT DIAMETER traffic 230 from home network and roaming devices.

Figure 5:
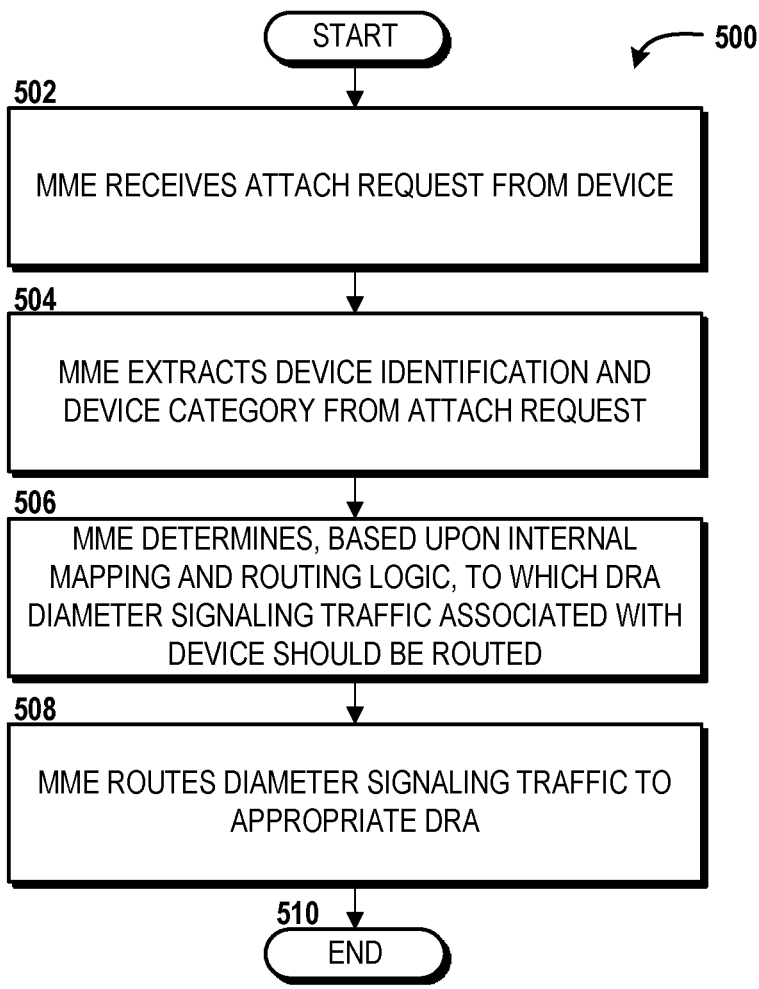
FIG. 5 is a flow diagram illustrating a method for IoT DIAMETER traffic routing, according to an illustrative embodiment.

Turning now to FIG. 5, aspects of a method 500 for IoT DIAMETER traffic routing will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 500 is described as being performed, at least in part, by one of the MMES 212 or one of the visited MMES 308 (referred to in FIG. 5 as "MME 212" for ease of description) via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 will be described with reference to FIG. 5 and further reference to FIGS. 2-4. The method 500 begins at operation 502, where the MME 212 receives an attach request from a device, such as one of the UEs 202 or one of the IoT devices 204. The attach request is sent by the device to the MME 212 to establish a connection. The attach request can include device identification information such as identification can include IMSI, MSISDN, IMEI, IMSI/IMEI, and/or any other device-specific ID as well as the device category supported in the network capability and priority indication for access into the network.

From operation 502, the method 500 proceeds to operation 504, where the MME 212 extracts the device identification and the device category from the attach request. In some embodiments, the MME 212 can analyze the attach request for the device's IMSI and/or other attributes such as MSISDN/IMEI in conjunction with the device's capability as well as category and priority (if applicable) that the MME 212 obtains from the non-active stratum ("NAS") layer.

From operation 504, the method 500 proceeds to operation 506, where the MME 212 determines, based upon internal mapping and routing logic, to which DRA (e.g., one of the IoT DRAs 216 or one of the DRAs 220 in the example shown in FIG. 2; one of the visited IoT-DRAs 312 or one of the visited DRAs 316 in the examples shown in FIGS. 3 and 4; collectively, hereinafter referred to in FIG. 5 as "DRA 220" and "IoT-DRA 216" for ease of description) signaling traffic associated with the device should be routed. The MME 212 can use the information extracted at operation 504 and can use dynamic learning of DRA mapping to steer the device associated with the information to a specific DRA. A dynamic learning process can involve the MME 212 correlating the extracted device information along with a lookup table of the available DRAs with their active link status and traffic utilization factors prior to marking rules based selection of the target DRA.

For example, the MME 212 can use, for a given set of devices falling under a specific IMSI number series, the IMSI range as well as the device's origin host (e.g., identified by a fully qualified domain name) and destination realm to steer all associated devices to a given DRA. The MME 212 can use odd/even IMSI series, destination host, DIAMETER application identifier, full address-based resolution to steer the devices in conjunction with the above information to steer the devices towards a specific DRA in a DRA pool. The MME 212 also can learn loading of DIAMETER peer DRA traffic utilization factors within the allowed set of DRAs/IoT-DRAs to be able to steer the devices appropriately so that there is no service impact during signaling storms.

From operation 506, the method 500 proceeds to operation 508, where the MME 212 routes DIAMETER signaling traffic to the appropriate DRA. For example, if the MME 212 determines, at operation 506, that the device is one of the UEs 202, then the MME 212 can route DIAMETER signaling traffic (and particularly, the DIAMETER traffic 228 in FIGS. 2-4) to one of the DRAs 220 as the appropriate DRA. If, however, the MME 212 determines, at operation 506, that the device is one of the IoT devices 204, then the MME 212 can route DIAMETER signaling traffic (and particularly, the IoT DIAMETER traffic 230 in FIGS. 2-4) to one of the IoT-DRAB 216 as the appropriate DRA. From operation 508, the method 500 proceeds to operation 510. The method 500 ends at operation 510.

Figure 6:
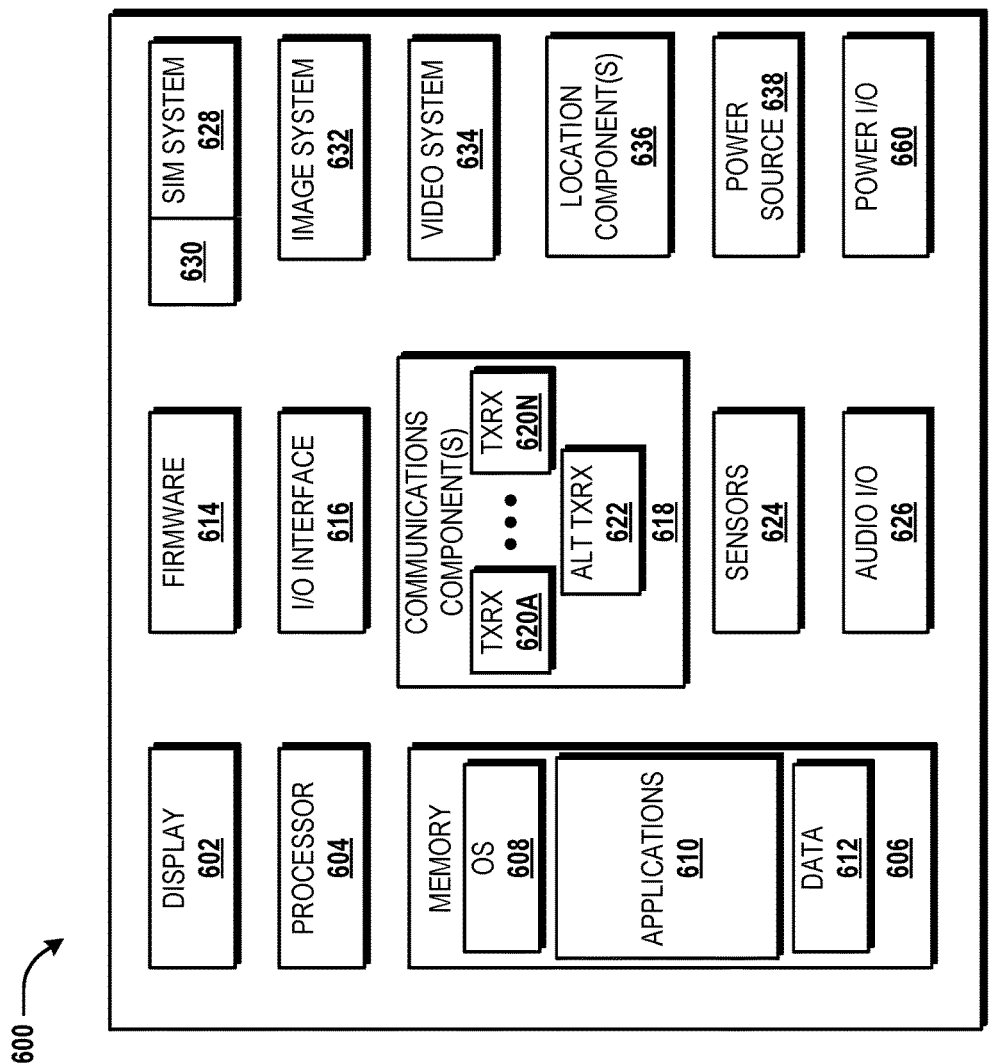
FIG. 6 is a block diagram illustrating an example mobile device capable of implementing aspects of the embodiments disclosed herein.

Turning now to FIG. 6, an illustrative mobile device 600 and components thereof will be described. In some embodiments, one or more of the UEs 202 (shown in FIG. 2) can be configured like the mobile device 600. In some embodiments, one or more of the IoT devices 204 can be configured like the mobile device 600. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a user interface ("UP") application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include, for example, one or more identifiers, and/or other applications or program modules. According to various embodiments, the data 612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 608 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using Global System for Mobile communications ("GSM"), Code Division Multiple Access ("CDMA") ONE, CDMA2000, Long-Term Evolution ("LTE"), and various other 2G, 2.4G, 3G, 4G, and greater generation technology standards. Moreover, the communications component 618 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 618 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 636. The video system 636 can be configured to capture, process, record, modify, and/or store video content. Photos and videos obtained using the image system 632 and the video system 636, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 628 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 660. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
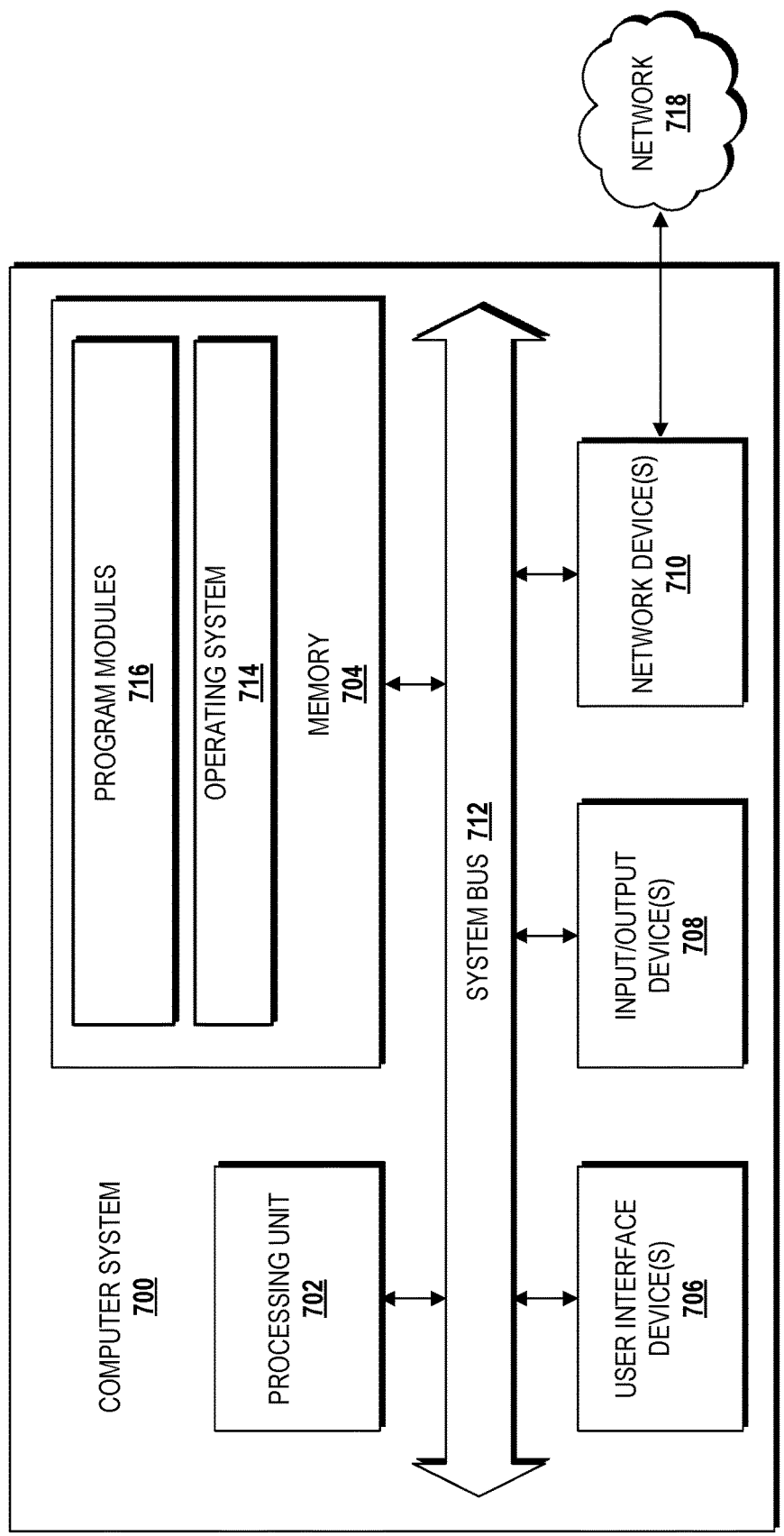
FIG. 7 is a block diagram illustrating an example computer system capable of implementing aspects of the embodiments presented herein.

Turning now to FIG. 7 is a block diagram illustrating a computer system 700 configured to provide the functionality in accordance with various embodiments of the concepts and technologies disclosed herein. The systems, devices, and other components disclosed herein can utilize, at least in part, an architecture that is the same as or at least similar to the architecture of the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be or may include a wired network such as, but not limited to, a Wide Area Network ("WAN"), a wired Personal Area Network ("PAN"), or a wired Metropolitan Area Network ("MAN"). The network 718 can be or can include the RAN 206, the EPC network 209, the visited core network 302, the home core network 304, and/or the IXC/IPX/IXC 334.

Figure 8:
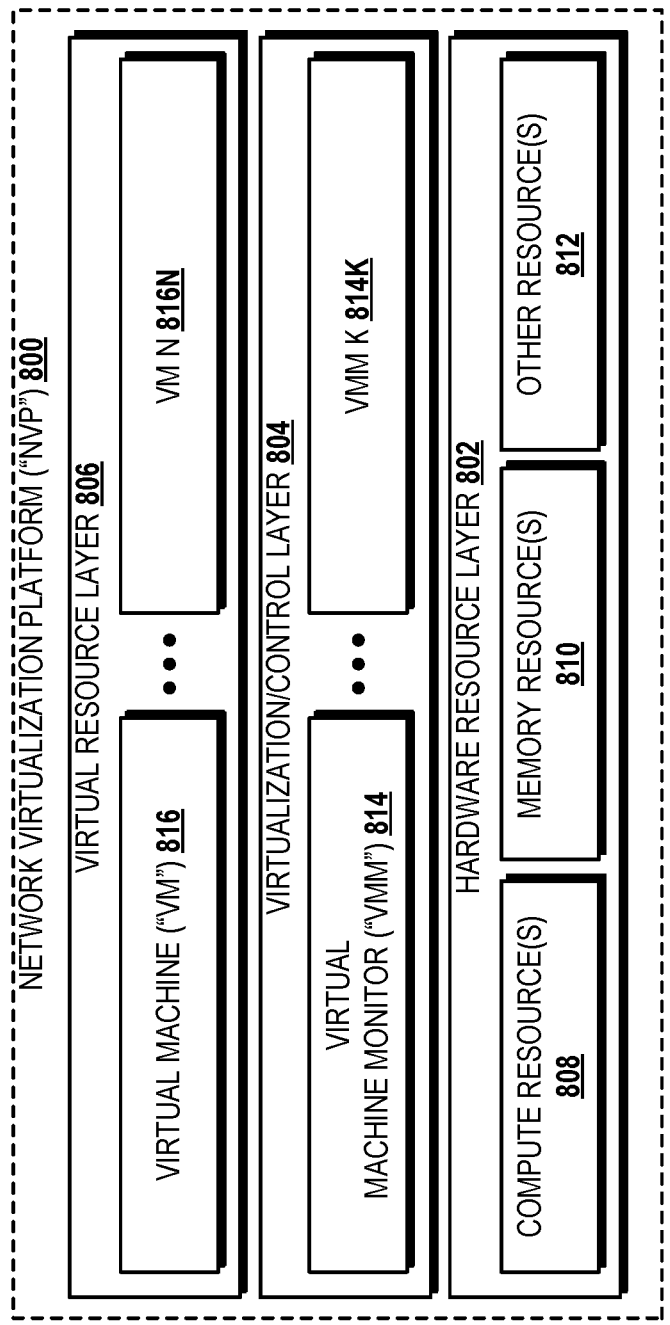
FIG. 8 is a block diagram illustrating an example network virtualization platform ("NVP") capable of implementing aspects of the embodiments presented herein.

Turning now to FIG. 8, a network virtualization platform ("NVP") 800 will be described, according to an exemplary embodiment. The architecture of the NVP 800 can be used to implement VNFs of the PNFs disclosed herein. For example, the NVP 800 can be utilized to implement the MMES 212, the IoT-DRAs 216, the DRAs 220, the HSSs 224, the visited MME 308, the visited IoT-DRAs 312, the visited DRAs 316, the visited DEAs 320, the home DEAs 326, the home HSSs 330, the visited CNM system 306, the home CNM system 324, and/or the centralized network management system 402.

The NVP 800 is a shared infrastructure that can support multiple services and network applications. The illustrated NVP 800 includes a hardware resource layer 802, a virtualization/control layer 804, and a virtual resource layer 806 that work together to perform operations as will be described in detail herein.

The hardware resource layer 802 provides hardware resources, which, in the illustrated embodiment, include one or more compute resources 808, one or more memory resources 810, and one or more other resources 812. The compute resource(s) 808 can include one or more hardware components that perform computations to process data, and/or to execute computer-executable instructions of one or more application programs, operating systems, and/or other software. The compute resources 808 can include one or more central processing units ("CPUs") configured with one or more processing cores. The compute resources 808 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 808 can include one or more discrete GPUs. In some other embodiments, the compute resources 808 can include CPU and GPU components that are configured in accordance with a co-processing CPU/GPU computing model, wherein the sequential part of an application executes on the CPU and the computationally-intensive part is accelerated by the GPU. The compute resources 808 can include one or more system-on-chip ("SoC") components along with one or more other components, including, for example, one or more of the memory resources 810, and/or one or more of the other resources 812. In some embodiments, the compute resources 808 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 808 can be or can include one or more hardware components architected in accordance with an ARM architecture, available for license from ARM HOLDINGS of Cambridge, United Kingdom. Alternatively, the compute resources 808 can be or can include one or more hardware components architected in accordance with an x86 architecture, such an architecture available from INTEL CORPORATION of Mountain View, Calif., and others. Those skilled in the art will appreciate the implementation of the compute resources 808 can utilize various computation architectures, and as such, the compute resources 808 should not be construed as being limited to any particular computation architecture or combination of computation architectures, including those explicitly disclosed herein.

The memory resource(s) 810 can include one or more hardware components that perform storage operations, including temporary or permanent storage operations. In some embodiments, the memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 808.

The other resource(s) 812 can include any other hardware resources that can be utilized by the compute resources(s) 808 and/or the memory resource(s) 810 to perform operations described herein. The other resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 802 can be virtualized by one or more virtual machine monitors ("VMMs") 814-814K (also known as "hypervisors"; hereinafter "VMMs 814") operating within the virtualization/control layer 804 to manage one or more virtual resources that reside in the virtual resource layer 806. The VMMs 814 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816-816N (hereinafter "VMs 816"). Each of the VMs 816 can execute one or more applications.

Based on the foregoing, it should be appreciated that concepts and technologies directed to intelligent signaling routing for M2M communications have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:
1. A mobility management entity comprising:
a processor; and
a memory that includes instructions that, when executed by the processor, cause the mobility management entity to perform operations comprising
receiving an attach request from a device to establish a connection to a network,
extracting device identification information from the attach request, determining an appropriate DIAMETER routing agent of a plurality of DIAMETER routing agents to which to route signaling traffic associated with the device, wherein the plurality of DIAMETER routing agents comprises a DIAMETER routing agent and an Internet of things application-specific DIAMETER routing agent, and routing the signaling traffic to the appropriate DIAMETER routing agent of the plurality of DIAMETER routing agents.

2. The mobility management entity of claim 1, wherein the device identification information comprises an International Mobile Subscriber Identity, a Mobile Station International Subscriber Directory Number, an International Mobile Equipment Identity, or a combination of an International Mobile Subscriber Identity and an International Mobile Equipment Identity.

3. The mobility management entity of claim 2, wherein the device identification information further comprises a device category.

4. The mobility management entity of claim 2, wherein determining the appropriate DIAMETER routing agent to which to route signaling traffic associated with the device comprises determining, based at least in part upon a given set of devices within a specific International Mobile Subscriber Identity number series, the appropriate DIAMETER routing agent to which to route signaling traffic associated with the device.

5. The mobility management entity of claim 4, wherein the International Mobile Subscriber Identity associated with the device is comprised within the specific International Mobile Subscriber Identity number series that identifies the given set of devices as Internet of things devices, and as such, the device as an Internet of things device.

6. The mobility management entity of claim 5, wherein the appropriate DIAMETER routing agent is the Internet of things application-specific DIAMETER routing agent.

7. The mobility management entity of claim 6, wherein the Internet of things application-specific DIAMETER routing agent is comprised within an Internet of things application-specific DIAMETER routing agent pool.

8. The mobility management entity of claim 7, wherein the Internet of things application-specific DIAMETER routing agent pool further comprises DIAMETER routing agents embodied as virtual network functions.

9. The mobility management entity of claim 7, wherein the operations further comprise instructing the Internet of things application-specific DIAMETER routing agent to route the signaling traffic to the DIAMETER routing agent as a fall back mechanism for routing the signaling traffic in response to an overload trigger detected by the Internet of things application-specific DIAMETER routing agent.

10. A computer-readable storage medium having instructions of a mobility management entity stored thereon that, when executed by a processor, cause the mobility management entity to perform operations comprising:

receiving an attach request from a device to establish a connection to a network;

extracting device identification information from the attach request;

determining an appropriate DIAMETER routing agent of a plurality of DIAMETER routing agents to which to route signaling traffic associated with the device, wherein the plurality of DIAMETER routing agents comprises a DIAMETER routing agent and an Internet of things application-specific DIAMETER routing agent; and routing the signaling traffic to the appropriate DIAMETER routing agent of the plurality of DIAMETER routing agents.

11. The computer-readable storage medium of claim 10, wherein the device identification information comprises an International Mobile Subscriber Identity, a Mobile Station International Subscriber Directory Number, an International Mobile Equipment Identity, or a combination of an International Mobile Subscriber Identity and an International Mobile Equipment Identity.

12. The computer-readable storage medium of claim 11, wherein the device identification information further comprises a device category.

13. The computer-readable storage medium of claim 11, wherein determining the appropriate DIAMETER routing agent to which to route signaling traffic associated with the device comprises determining, based at least in part upon a given set of devices within a specific International Mobile Subscriber Identity number series, the appropriate DIAMETER routing agent to which to route signaling traffic associated with the device.

14. The computer-readable storage medium of claim 13, wherein the International Mobile Subscriber Identity associated with the device is comprised within the specific International Mobile Subscriber Identity number series that identifies the given set of devices as Internet of things devices, and as such, the device as an Internet of things device.

15. The computer-readable storage medium of claim 14, wherein the appropriate DIAMETER routing agent is the Internet of things application-specific DIAMETER routing agent; the Internet of things application-specific DIAMETER routing agent is comprised within an Internet of things application-specific DIAMETER routing agent pool that further comprises DIAMETER routing agents embodied as virtual network functions; and the operations further comprise instructing the Internet of things application-specific DIAMETER routing agent to route the signaling traffic to the DIAMETER routing agent as a fall back mechanism for routing the signaling traffic in response to an overload trigger detected by the Internet of things application-specific DIAMETER routing agent.

16. A method comprising:

receiving, by a mobility management entity executing instructions for routing signaling traffic, an attach request from a device to establish a connection to a network;

extracting, by the mobility management entity, device identification information from the attach request;

determining, by the mobility management entity, an appropriate DIAMETER routing agent of a plurality of DIAMETER routing agents to which to route signaling traffic associated with the device, wherein the plurality of DIAMETER routing agents comprises a DIAMETER routing agent and an Internet of things application-specific DIAMETER routing agent; and routing, by the mobility management entity, the signaling traffic to the appropriate DIAMETER routing agent of the plurality of DIAMETER routing agents.

17. The method of claim 16, wherein the device identification information comprises an International Mobile Subscriber Identity, a Mobile Station International Subscriber Directory Number, an International Mobile Equipment Identity, or a combination of an International Mobile Subscriber Identity and an International Mobile Equipment Identity.

18. The method of claim 17, wherein determining, by the mobility management entity, the appropriate DIAMETER routing agent to which to route signaling traffic associated with the device comprises determining, based at least in part upon a given set of devices within a specific International Mobile Subscriber Identity number series, the appropriate DIAMETER routing agent to which to route signaling traffic associated with the device.

19. The method of claim 18, wherein the International Mobile Subscriber Identity associated with the device is comprised within the specific International Mobile Subscriber Identity number series that identifies the given set of devices as Internet of things devices, and as such, the device as an Internet of things device; the appropriate DIAMETER routing agent is the Internet of things application-specific DIAMETER routing agent; and the Internet of things application-specific DIAMETER routing agent is comprised within an Internet of things application-specific DIAMETER routing agent pool that further comprises DIAMETER routing agents embodied as virtual network functions.

20. The method of claim 19, further comprising instructing the Internet of things application-specific DIAMETER routing agent to route the signaling traffic to the DIAMETER routing agent as a fall back mechanism for routing the signaling traffic in response to an overload trigger detected by the Internet of things application-specific DIAMETER routing agent.

* * * * *